(12) United States Patent
Martin et al.

(10) Patent No.: US 9,811,380 B1
(45) Date of Patent: Nov. 7, 2017

(54) DYNAMIC ALLOCATION OF CPU RESOURCES BASED ON SYSTEM LOAD TRENDS

(71) Applicant: EMC IP Holding Company LLC, Hopkinton, MA (US)

(72) Inventors: Owen Martin, Hopedale, MA (US); Lev Knopov, Brookline, MA (US); Igor Achkinazi, Northborough, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/971,249

(22) Filed: Dec. 16, 2015

(51) Int. Cl.
*G06F 12/08* (2016.01)
*G06F 9/50* (2006.01)
*G06F 3/06* (2006.01)

(52) U.S. Cl.
CPC ............ *G06F 9/50* (2013.01); *G06F 3/0619* (2013.01); *G06F 3/0631* (2013.01); *G06F 3/0665* (2013.01); *G06F 3/0689* (2013.01); *G06F 9/5083* (2013.01)

(58) Field of Classification Search
CPC . G06F 11/0781; G06F 17/2725; G06Q 30/02; H04L 41/0631; H04L 43/065; H04L 43/067; H04L 67/22
See application file for complete search history.

(56) References Cited

U.S. PATENT DOCUMENTS 9,354,959 B2 * 5/2016 Embree ................. G06Q 30/02

* cited by examiner

*Primary Examiner* — Yong Choe
(74) *Attorney, Agent, or Firm* — Muirhead and Saturnelli, LLC

(57) ABSTRACT

Described are techniques for partitioning processors in a system. At a first point in time, a short term workload ratio and a long term workload ratio are determined. At the first point in time, the system is in a first workload state having a first configuration including a first portion of the processors performing front end processing tasks and a second portion of the processors performing back end processing tasks. A first value is determined where the first value is an absolute value of a difference between the short term workload ratio and the long term workload ratio. First processing is performed that determines, in accordance with the first value and the short term workload ratio, whether to adjust any of the first portion of the processors and the second portion of the processors of the first configuration.

20 Claims, 9 Drawing Sheets

US 9,811,380 B1

DYNAMIC ALLOCATION OF CPU RESOURCES BASED ON SYSTEM LOAD TRENDS

BACKGROUND

Technical Field

This application generally relates to distribution of resources based on workload.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

SUMMARY OF THE INVENTION

In accordance with one aspect of the invention is a method of partitioning processors in a system comprising: determining, at a first point in time, a short term workload ratio and a long term workload ratio, wherein, at the first point in time, the system is in a first workload state having a first configuration including a first portion of the processors performing front end processing tasks and a second portion of the processors performing back end processing tasks; determining a first value that is an absolute value of a difference between the short term workload ratio and the long term workload ratio; and performing first processing to determine, in accordance with the first value and the short term workload ratio, whether to adjust any of the first portion of the processors and the second portion of the processors of the first configuration. The first processing may include determining whether the first value exceeds a threshold; and if the first value does not exceed the threshold, determining not to adjust any of the first portion of the processors and the second portion of the processors of the first configuration. The first processing may include performing second processing if the first value exceeds the threshold, the second processing comprising determining a target workload state in accordance with the short term workload ratio, said target workload state indicating a target configuration with a target partitioning of the processors between performing front end processing tasks and back end processing tasks. The second processing may include determining whether the current workload state and the target workload state are different; and if it is determined that the current workload state and the target workload state are different, performing an adjustment to the first configuration to repartition, in accordance with the target configuration, the processors between performing front end processing tasks and back end processing tasks. Each of the current workload state and the target workload state may denote any of a balanced state, a front end heavy state, and a back end heavy state. The current workload state may be any of the balanced state and the front end heavy state and the target workload state is the back end heavy state, and processing may be performed to increase a number of the processors in the second portion and decrease a number of the processors in the first portion. The current workload state may be any of the balanced state and the back end heavy state and the target workload state may be the front end heavy state, and the method may include performing processing to increase a number of the processors in the first portion and decrease a number of the processors in the second portion. The target workload state may be the balanced state and the current workload state may be any of the back end heavy state and the front end heavy workload, and the method may include performing processing to partition a same number of the processors in both the first portion and the second portion. The short term workload ratio may be a ratio of a short term front end workload metric with respect to a short term back end workload metric. The long term workload ratio may be a ratio of a long term front end workload metric with respect to a long term back end workload metric. The short term workload ratio and the long term workload ratio may denote an overall workload trend. The system may be a data storage system. The front end processing tasks may include tasks performed for processing received I/O operations at the data storage system. The back end processing tasks may include tasks performed for back end I/O operations of the data storage system and may include accessing physical storage devices of the data storage system.

In accordance with another aspect of the invention is a system comprising: a plurality of processors; and a memory comprising code stored therein that, when executed, performs a method of partitioning the processors comprising: determining, at a first point in time, a short term workload ratio and a long term workload ratio, wherein, at the first point in time, the system is in a first workload state having a first configuration including a first portion of the processors performing front end processing tasks and a second portion of the processors performing back end processing tasks; determining a first value that is an absolute value of a difference between the short term workload ratio and the long term workload ratio; and performing first processing to determine, in accordance with the first value and the short term workload ratio, whether to adjust any of the first portion of the processors and the second portion of the processors of the first configuration.

In accordance with another aspect of the invention is a computer readable medium comprising code stored thereon that, when executed, performs a method of partitioning processors in a system comprising: determining, at a first point in time, a short term workload ratio and a long term workload ratio, wherein, at the first point in time, the system is in a first workload state having a first configuration including a first portion of the processors performing front end processing tasks and a second portion of the processors performing back end processing tasks; determining a first value that is an absolute value of a difference between the short term workload ratio and the long term workload ratio; and performing first processing to determine, in accordance with the first value and the short term workload ratio, whether to adjust any of the first portion of the processors and the second portion of the processors of the first configuration. The first processing may include determining whether the first value exceeds a threshold; and if the first value does not exceed the threshold, determining not to adjust any of the first portion of the processors and the second portion of the processors of the first configuration. If the first value exceeds the threshold, the first processing may further comprise, performing second processing comprising: determining a target workload state in accordance with the short term workload ratio, said target workload state indicating a target configuration with a target partitioning of the processors between performing front end processing tasks and back end processing tasks. The second processing may include determining whether the current workload state and the target workload state are different; and if it is determined that the current workload state and the target workload state are different, performing an adjustment to the first configuration to repartition, in accordance with the target configuration, the processors between performing front end processing tasks and back end processing tasks. Each of the current workload state and the target workload state may denote any of a balanced state, a front end heavy state, and a back end heavy state.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
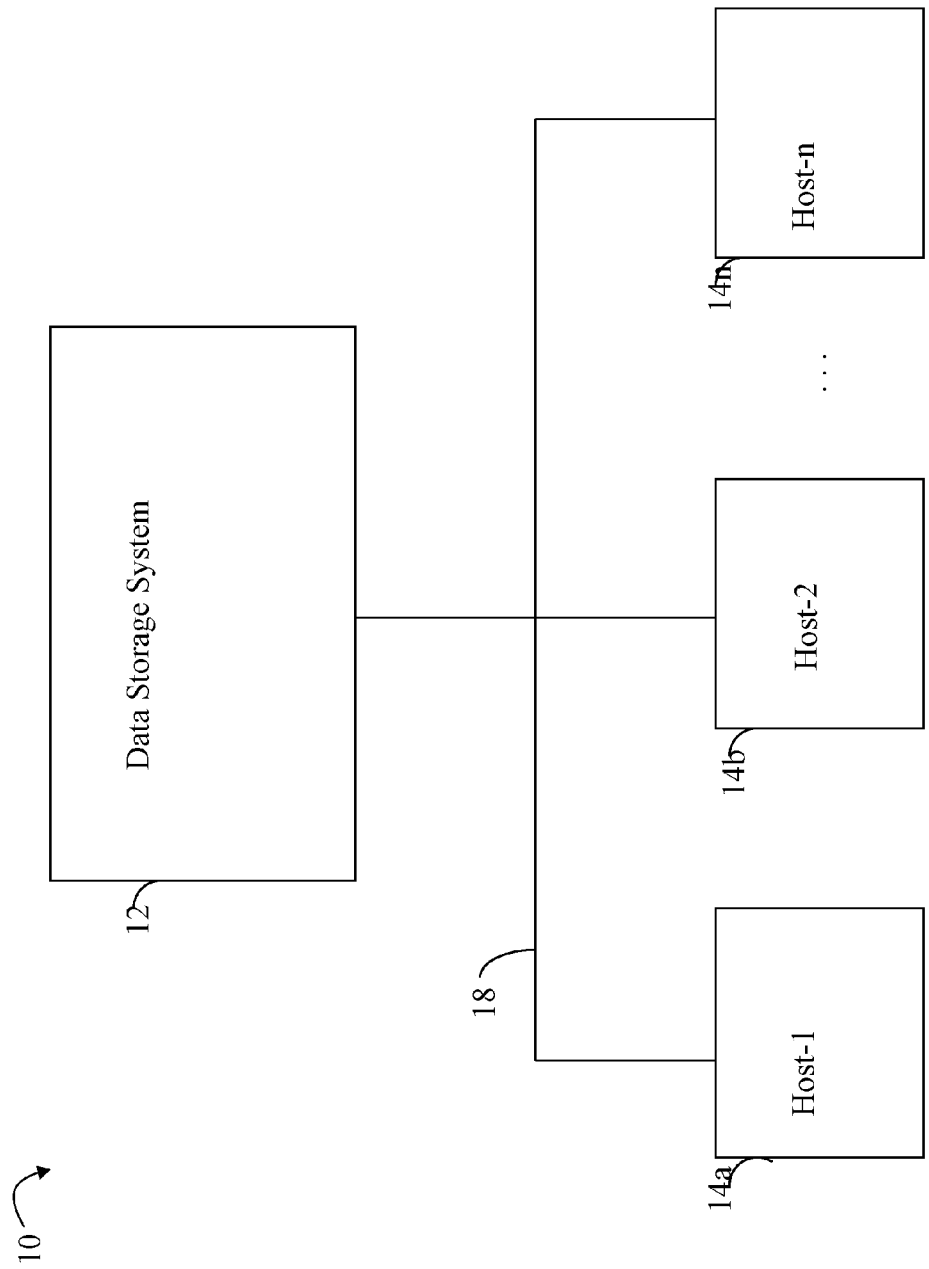
FIG. 1 is an example of an embodiment of a network and system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and also various file system protocols (e.g., NFS, pNFS) and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
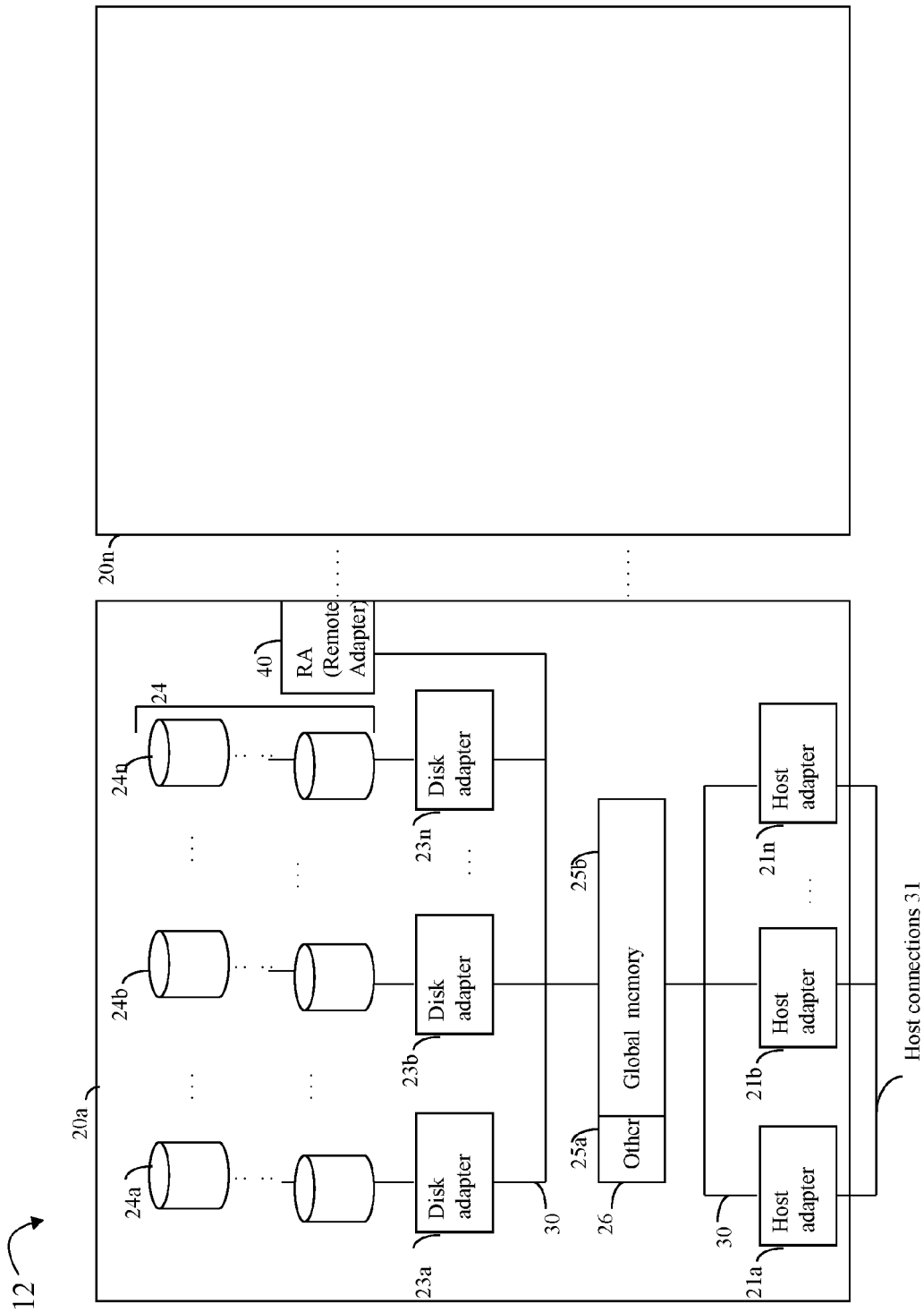
FIG. 2A is an example of an embodiment of a data storage system in accordance with techniques herein.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide data storage services to, for example, host computer systems. It should be noted that the data storage system 12 may operate standalone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n. In this arrangement, each of the n groupings of disks may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk controller. The DA may performed operations such as reading data from, and writing data to, the physical devices (e.g., physical storage devices also referred to as PDs) which are serviced by the DA.

It should be noted that the data storage devices 24a-24n may be generally any suitable back-end physical storage device such as, for example, a rotating disk drive, a flash-based drive or more generally any form of solid state drive (SSD) (e.g., drive that is not a rotating disk drive), and the like.

An embodiment may have one or more defined storage tiers with respect to data storage provided by one or more data storage systems. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as a rotating SAS, or NL-SAS disk drive, and the like. Data protection may specify a type or level of data storage protection such, for example, as a particular RAID (Redundant Array of Independent Disks) level (e.g., RAID1 providing data mirroring, RAID-5 3+1, RAID-5 7+1, and the like). Performance characteristics may relate to different performance aspects of the physical storage devices of a particular type or technology. For example, there may be multiple types of rotating disk drives based on the RPM characteristics of the disk drives (e.g., 10K RPM drives and 15K RPM drives) and disk drives having different RPM characteristics may be included in different storage tiers. Storage capacity may specify the amount of data, such as in bytes, that may be stored on the drives. To further illustrate, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all 15K RPM disk drives, and a third tier of all 7.2K RPM disk drives. The foregoing are some examples of tier definitions and, of course, other tier definitions may be specified.

Also shown in the storage system 20a is an RA or remote adapter 40. The RA may be hardware including a processor used to facilitate communication between data storage systems, such as between two of the same or different types of data storage systems.

The system 20a may also include one or more front end adapters or host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive, or more generally, a physical data storage device. Data residing on a physical data storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
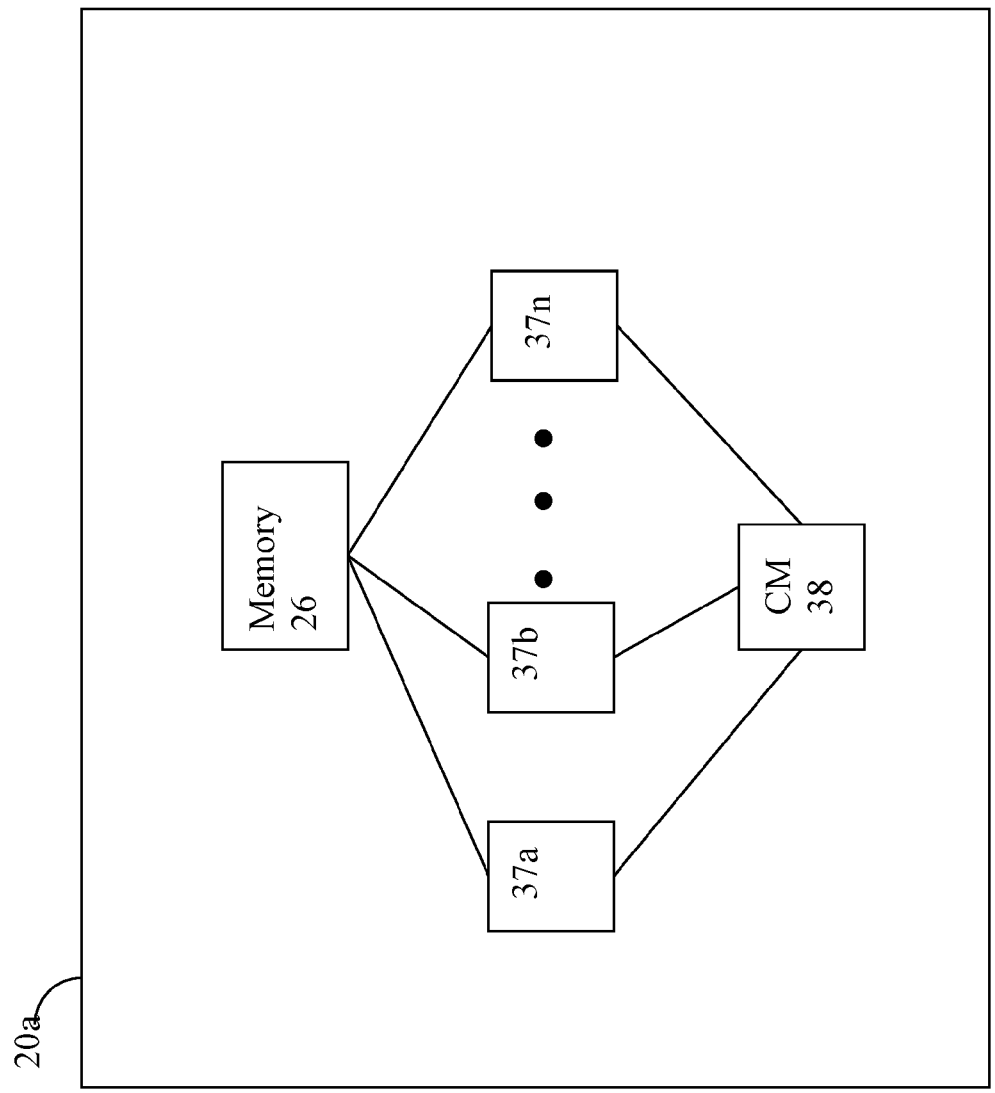
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In some embodiments, the data storage system may be an intelligent data storage system having its own one or more mapping layers. For example, a LUN known or exposed to the host may not directly correspond to a physical device such as a disk drive. In such embodiments, the LUN identified by the host in connection with the I/O operation may be further mapped by the data storage system using its mapping layer. For example, a LUN provided by the host may be mapped by the data storage system to one or more physical drives, multiple LUNs may be located on a same physical device, multiple physical drives, and the like. In other embodiments, the data storage system may not include such a mapping layer(s).

A host, as a data storage client, may communicate using any suitable protocol. For example, a host may issue reads and/or writes as well as other requests using any of block-based protocols and interfaces, file-based protocols and interfaces, and object-based protocols and interfaces.

With reference back to FIG. 2A, components of the data storage system may communicate using global memory (GM) 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP), and then later de-stage the WP data from cache to one of the devices 16a-16n.

When servicing a read operation, the data storage system may first determine whether the requested read data is in cache thereby resulting in a read cache hit. If a read cache hit (e.g., read hit) occurs, the requested read data may be retrieved from cache and returned to the requesting client. If a read cache miss (e.g., read miss) otherwise occurs whereby the requested read data is not in cache, the requested read data is read from physical storage thereby increasing the amount of time needed to service the read operation over the amount of time needed to service the read when there is a cache hit. In connection with returning data to a host from one of the devices as part of a read operation when a read cache miss occurs, the data may be copied from a physical storage device (e.g. one of the storage devices providing non-volatile physical storage of 24) by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. In at least one embodiment of a data storage system in accordance with techniques herein, the data storage system may include multiple CPU "cores" or processors partitioned to function as the different components, such as DAs, FAs, RAs and the like, and to perform tasks handled by such components. For example, a number of CPU processors or cores may be configured to function as DAs and read data from physical storage and write data to physical storage (e.g., performing back end I/O operations and processing tasks denoting a back end I/O workload). As another example, a number of CPU processors or cores may be configured to function as FAs and receive external I/Os such as from hosts or other clients of the data storage system (e.g. where such processors perform processing and handling of front end I/O operations denoting a front end I/O workload). The various CPU processors or cores may have their own memory used for communication between other CPU processors or cores rather than utilize a global memory accessible to all storage processors. In such embodiments, memory 26 may represent memory of the CPU processors or cores.

Generally, each host or front end I/O received by the data storage system may result in a different number of back end or physical storage device I/Os. For example, a host read that results in a read cache hit further results in no BE I/O workload. When writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may include a front end workload and a back end workload. The front end workload may be based on the number of I/O operations (reads and writes) received by the data storage system (e.g., I/O received from hosts or external client I/Os). The back end workload may be based on the I/O operations (read and writes) performed by the DA (e.g., back end read and write commands may correspond, respectively, to physical storage device accesses such as disk reads and writes that may result from a host I/O request received by an HA).

The data storage system may include a collection of CPU cores or processors that may be statically partitioned to perform various functions or tasks in the data storage system. A first set of the processors may be designated as DA cores or processors performing back end data storage system tasks and back end I/O operations such as accessing physical storage devices using back end ports. A second set of the processor may be designated as FA cores or processors performing front end I/O operations and front end data storage system tasks such as communicating with hosts or external components using front end ports, receiving I/O operations from such hosts or external components, returning any requested data (e.g., such as with a read I/O operation) and/or an acknowledgement to the requester, and the like. Additionally a third set of the processors may be designated as data services or middleware processors performing all other processing and services not handled by other cores functioning as DAs and FAs. For example, data services or middleware cores facilitate communication between CPU cores, such as between cores functioning as a DA and an FA, performs various data services such as replication, and the like.

A typical balanced layout or configuration of the processors in the data storage system may include CPU cores statically divided equally into fixed proportions. In the balanced layout or configuration, the CPU cores may be partitioned into 3 groups: group 1 functioning as DAs and performing back end processing tasks, group 2 functioning as FAs and performing front end processing tasks, and group 3 performing all other processing and services not handled by a processor in groups 1 and 2.

A processor configuration may be modified manually to a desired particular configuration of processors partitioning the processors among the foregoing 3 groups in a variation from the above-noted typical balanced layout if the workloads of the various types of tasks or functions performed by DAs, FAs and data services/middleware groups are known. A mistake in the partitioning of the processors in a data storage system configuration or layout among the foregoing 3 groups may create performance bottlenecks or generally overload some processors performing one set of tasks while also leaving other processors performing a second different set of tasks idle or generally underutilized.

Multiple hosts and multiple different applications may issue I/Os to the data storage system. Thus, a data storage system's I/O workload may not always have the same I/O workload characteristics, and changes to the particular I/O workload characteristics may not always be predictable at different points in time. Additionally, to manually make any such modifications to the layout by repartitioning the CPU cores on a continual basis may be undesirable due to costs and time.

Thus, to address the foregoing challenges, techniques are described in following paragraphs to dynamically distribute or partition CPU cores to perform different front-end (e.g., FA) and back-end (e.g., DA) tasks based on I/O workloads of the data storage system. To distribute and redistribute CPU cores effectively, techniques described herein may establish what particular I/O workload requires additional front end or back end CPU core resources. For example, if the I/O workload is expected to be front end heavy, such as having a high read cache hit rate, then more CPU cores may be allocated to perform front end or FA tasks. In contrast, if the I/O workload is expected to be back end heavy, such as having a high read cache miss rate and/or being write heavy, then more CPU cores may be allocated to perform backend or DA tasks. Knowing that a particular type of I/O workload would benefit by allocating a higher percentage of CPU cores to either function as FAs or DAs, techniques herein may also examine the overall trend of the I/O workload based on short term and long term workload metrics, such as short term and long term moving averages. Techniques herein may, for example, determine that when the current short term I/O workload is busier than the overall trend, the system is shifting toward an I/O workload having characteristics that would benefit from a repartitioning or change with respect to a currently defined layout of CPU cores. An embodiment in accordance with techniques herein may provide for automatically and dynamically repartitioning the CPU cores functioning as FAs (performing front end tasks) and DAs (performing back end tasks) based on the current trend and also based on the short term workload. The foregoing and other aspects of techniques herein, as well as examples of embodiments of techniques herein, are described in more detail in following paragraphs.

Figure 3:
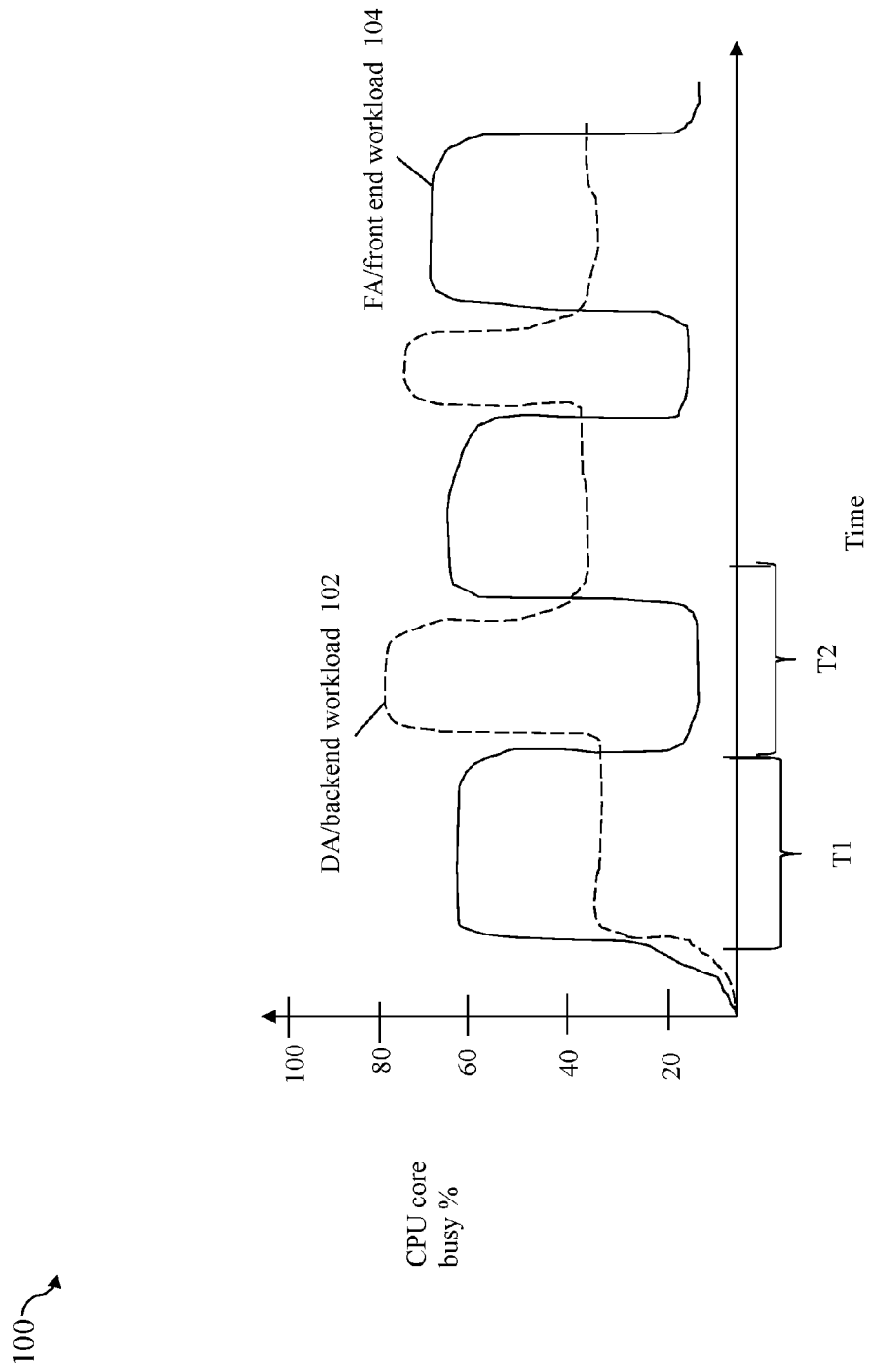
FIGS. 3 and 8 are examples illustrating CPU utilization.

Referring to FIG. 3, shown is a graphical illustration of front end and back end CPU utilization that may be experienced in a data storage system. The example 100 illustrates changes in observed front end and back end CPU utilization and thus changes in associated workload of the front and backend over time. The Y axis denotes a percentage of CPU cores that are busy (not idle) at a point in time and the X axis denotes various points in time. The Y axis is an example of one metric that may be used to denote a current workload at a point in time of the CPU cores currently partitioned for each of the front end and the back end. In particular, the example 100 includes a first dashed line 102 denoting the percentage of CPU cores functioning as DAs performing backend tasks that are busy at different points in time. A second solid line 104 denotes the percentage of CPU cores functioning as FAs performing front end tasks that are busy at different points in time. For example, assuming that the same number of CPU cores are currently partitioned for use as DAs and FAs, for the time period denoted by T1 on the X axis, the FA or front end workload illustrated by 104 is approximately twice that of the DA or backend workload illustrated by 102. For the subsequent time period denoted by T2, the DA or backend workload as denoted by 102 further increases and the FA or front end workload as denoted by 104 further decreases. In time periods such as T1 and in particular T2, it may be desirable to repartition or redistribute the number of CPU cores in an automated manner to more efficiently utilize the CPU cores and have a more even CPU utilization (e.g., more evenly distributed level or % of busy CPU cores across the FAs and DAs). For example, during time period T1, it may desirable to allocate more CPU cores to perform FA or front end tasks than the number of CPU cores performing DA or backend tasks. During time period T2, it may be desirable to allocate more CPU cores to perform DA or backend tasks than the number of CPU cores performing FA or front end tasks. Additionally, it may be desirable to predict the front end and back end workloads, perform an evaluation of whether to take an action and redistribute the CPU cores between DAs and FAs and also what action to take (e.g., allocate more CPU cores for DA or backend use, or more CPU cores for FA or front end use). The foregoing aspects of techniques that may be used in an embodiment are described in more detail in following paragraphs.

In at least one embodiment, the front end (FE) workload may be expressed as an I/O rate (e.g., I/Os per second) and may be based, for example, on the total number of host or FE read cache hits and host or FE writes received. The back end (BE) workload may also be expressed as an I/O rate and may be based on the total number of host or FE read cache misses, total write operations destaged, and an additional factor F to account for any BE workload generated from internal data storage system operations. Consistent with discussion elsewhere herein, it should be noted that the FE workload is based on the number of I/O operations received by the data storage system or FE I/O operations. The BE workload is based on BE I/O operations or physical storage device I/O operations performed which access the physical storage. As a result, the factor F may be used to account for the additional BE or physical storage device reads and/or writes performed, for example, due to RAID group rebuild operations, additional physical device reads and/or writes for RAID groups due to parity, data movement or migration of data such as between storage tiers of different performance storage devices where with data movements may be performed by a data storage optimizer to meet performance requirements and/or improve system health and performance.

An embodiment in accordance with techniques herein may use a short term (ST) FE workload metric, a ST back end (BE) workload metric, a long term (LT) FE workload metric, and a LT BE workload metric. The ST and LT FE workload metrics may denote, respectively, ST and LT workload of the FE or FAs (e.g. by the CPU cores performing such FA or FE tasks). The ST and LT BE workload metrics may denote, respectively, ST and LT workload of the BE or DAs (e.g., by the CPU cores performing such BE or DA tasks). With reference back to FIG. 3, in an embodiment in accordance with techniques herein, a first set of lines or signals 102 and 104 may respectively denote the ST BE workload metric and ST FE workload metric at various points in time. An embodiment in accordance with techniques herein may also use a second set of lines or signals 102 and 104 respectively denoting the LT BE workload metric and LT FE workload metric at various points in time.

In at least one embodiment in accordance with techniques herein, the ST and LT FE workload metrics and the ST and LT BE workload metrics may be exponential moving averages. For example, the ST FE and BE workload metrics may be exponential moving averages with a half-life of 24 hours, and the LT FE and BE workload metrics may be exponential moving averages with a half-life of 5 days. An observed or measured FE workload and an observed or measured BE workload may be obtained every sample period, t, such as every 5 or 10 minutes or more generally, any suitable sampling time period.

The ST FE workload metric used in one embodiment may be expressed as follows in EQUATION 1:

$$\text{ST FE workload metric}_t = \text{Alpha\_ST} * \text{ST FE workload metric}_{t-1} + (1 - \text{Alpha\_ST}) * \text{FE workload}_t$$

where

"FE workload$_t$" is the actual observed or measured FE I/O workload for the current sampling period "t";

"Alpha_ST" is the short term decay coefficient;

"ST FE workload metric$_t$" is the adjusted or calculated ST FE workload for the sampling period "t"; and "ST FE workload metric$_{t-1}$" is the adjusted or calculated ST FE workload based on EQUATION 1 for the previous sample period "t−1".

The ST BE workload metric used in one embodiment may be expressed as follows in EQUATION 2:

$$\text{ST BE workload metric}_t = \text{Alpha\_ST} * \text{ST BE workload metric}_{t-1} + (1 - \text{Alpha\_ST}) * \text{BE workload}_t$$

where

"BE workload$_t$" is the actual observed or measured BE I/O workload for the current sampling period "t";

"Alpha_ST" is the short term decay coefficient;

"ST BE workload metric$_t$" is the adjusted or calculated ST BE workload for the sampling period "t; and "ST BE workload metric$_{t-1}$" is the adjusted or calculated ST FE workload based on EQUATION 2 for the previous sample period "t−1".

The LT FE workload metric used in one embodiment may be expressed as follows in EQUATION 3:

$$\text{LT FE workload metric}_t = \text{Alpha\_LT} * \text{LT FE workload metric}_{t-1} + (1 - \text{Alpha\_LT}) * \text{FE workload}_t$$

where

"FE workload$_t$" is the actual observed or measured FE I/O workload for the current sampling period "t";

"Alpha_LT" is the long term decay coefficient; LT FE workload metric$_t$ is the adjusted or calculated LT FE workload for the sampling period "t; and "LT FE workload metric$_{t-1}$" is the adjusted or calculated LT FE workload based on EQUATION 3 for the previous sample period "t−1".

The LT BE workload metric used in one embodiment may be expressed as follows in EQUATION 4:

$$\text{LT BE workload metric}_t = \text{Alpha\_LT} * \text{LT BE workload metric}_{t-1} + (1 - \text{Alpha\_LT}) * \text{BE workload}_t$$

where

"BE workload$_t$" is the actual observed or measured BE I/O workload for the current sampling period "t";

"Alpha_LT" is the long term decay coefficient;

LT BE workload metric$_t$ is the adjusted or calculated LT BE workload for the sampling period "t"; and "LT BE workload metric$_{t-1}$" is the adjusted or calculated LT BE workload based on EQUATION 4 for the previous sample period "t−1".

Generally, Alpha_ST and Alpha_LT are decay coefficients selected accordingly to give a desired amount of weight to previous or historic workload. The closer a decay coefficient is to zero, the lesser the weight given to previous workload or activity. Similarly, the larger the decay coefficient, the greater the weight given to previous workload or activity. Generally, Alpha_ST is less than Alpha_LT. In at least one embodiment having a 600 second sample period, Alpha_ST may be 0.00545 and Alpha_LT may be 0.0011. The foregoing values for Alpha_ST and Alpha_LT correspond, respectively, to a decay half-life of 24 hours and 4 days.

With reference back to FIG. 3, an embodiment in accordance with techniques herein may combine a pair of values from the foregoing first set of two signals or lines 102 (the DA/backend workload) and 104 (the FA/front end workload) for the ST workload metrics (based on EQUATIONS 1 and 2) at a point in time using a first ST ratio described below in EQUATION 5. An embodiment in accordance with techniques herein may combine a pair of values from the foregoing second set of two signals or lines 102 (the DA/backend workload) and 104 (the FA/front end workload) for the LT workload metrics (based on EQUATIONS 3 and 4) at a point in time using a second LT ratio described below in EQUATION 6.

An embodiment may calculate and use the ST FE workload metric$_t$ of EQUATION 1 and the ST BE workload metric$_t$ of EQUATION 2, both based on the same point in time, "t", to form a ST ratio$_t$ (also referred to as the ST workload ratio for time "t") that may be expressed as:

$$\text{ST ratio}_t = \text{ST FEworkload metric}_t/\text{ST BE workload metric}_t \quad \text{EQUATION 5}$$

An embodiment may calculate and use the LT FE workload metric$_t$ of EQUATION 3 and the LT BE workload metric$_t$ of EQUATION 4, both based on the same point in time, "t", to form a LT ratio$_t$ (also referred to as the LT workload ratio for time "t") that may be expressed as:

$$\text{LT ratio}_t = \text{FE LT workload metric}_t/\text{BE LT workload metric}_t \quad \text{EQUATION 6}$$

In at least one embodiment, the ST workload trend may be based on the ST ratio across points in time, the LT workload trend may be based on the LT ratio across points in time, and the overall trend of the workload may be based on, or denoted by, both the ST ratio of EQUATION 5 and the LT ratio of EQUATION 6. In one embodiment, the overall trend may be denoted by an absolute value of the difference between the ST ratio and the LT ratio as in EQUATION 7 explained below.

Figure 4:
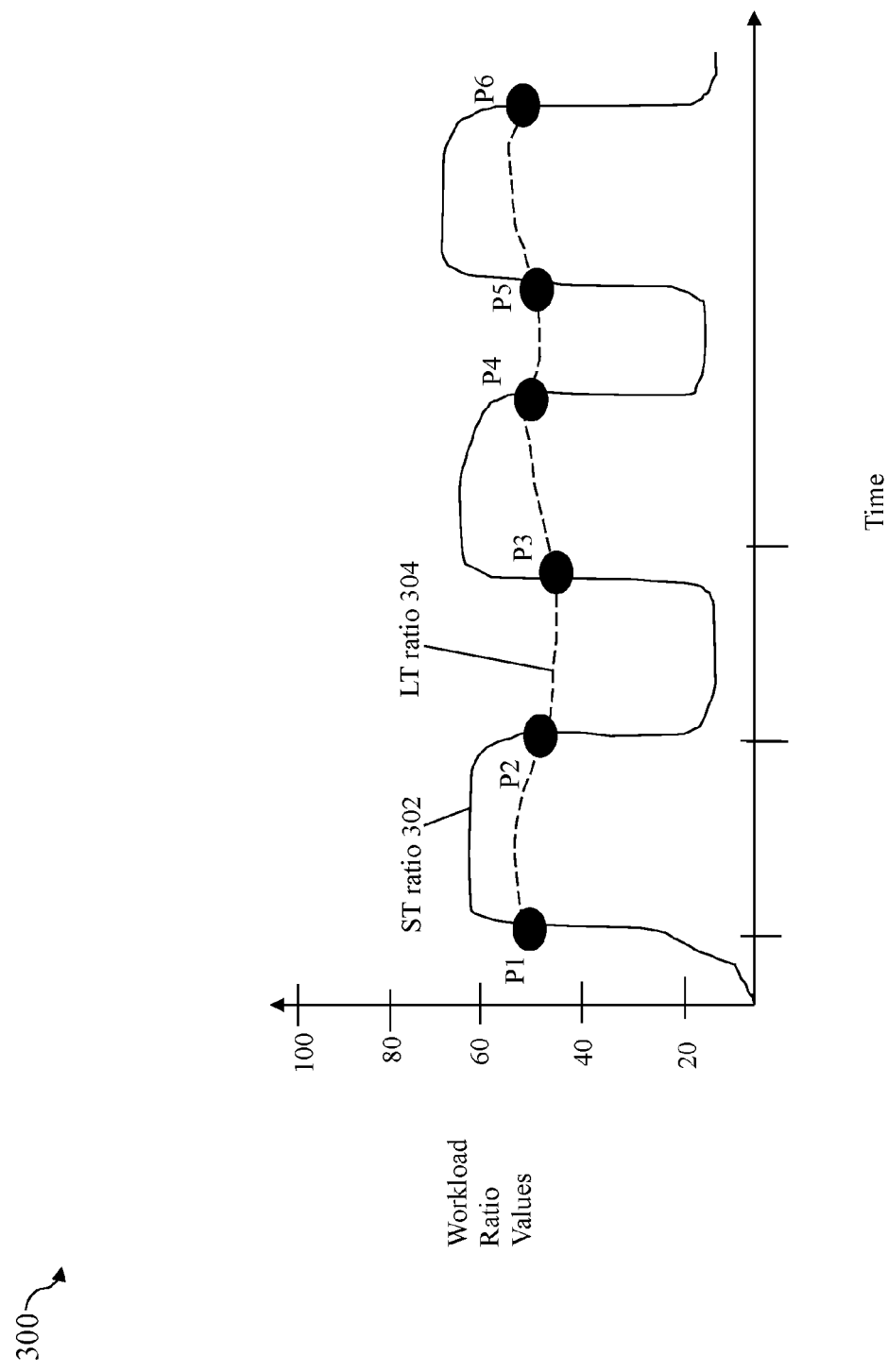
FIG. 4 is an example illustrating workload ratio values in an embodiment in accordance with techniques herein.

Referring to FIG. 4, shown is an example graphically illustrating how values for the ST ratio determined using EQUATION 5 and LT ratio determined using EQUATION 6 may vary at different points in time in an embodiment in accordance with techniques herein. Line 302 is a solid line indicating different values of the ST ratio at different points in time where line 302 may denote the ST workload trend over time. Line 304 is a dashed line indicating different values of the LT ratio at different points in time where line 304 may denote the LT trend.

As can be seen in the example 300, dashed line 304 of the LT ratio denoting the LT trend is slower to react or change with respect to changes in workload in comparison to the ST trend over time as illustrated by line 302. Of interest in connection with an embodiment in accordance with techniques herein are the inflection or crossover points P1-P6 and then when, if at all, does the difference between the LT and ST ratios as the same point in time exceed some specified threshold. Of interest in connection with an embodiment in accordance with techniques herein is the difference, or more specifically, the absolute value of the difference, between the LT ratio and ST ratio at each point in time and when/if such absolute value exceeds a threshold. In an embodiment in accordance with techniques herein, a determination may be made as to whether the absolute value of the difference between the LT ratio and ST ratio at the same point in time is larger than a defined threshold value. If the absolute value of the difference exceeds the defined threshold value, an action may be taken to reallocate, redistribute or adjust the number of the CPU cores performing FE/FA tasks and BE/DA tasks. Thus, the absolute value of the difference between the LT ratio and ST ratio exceeding the threshold may be characterized in one aspect as a trigger condition that may result in taking an action to adjust the number of CPU cores performing FE and BE tasks. It should be noted that the absolute value of the difference exceeding the threshold implies that either the LT ratio is greater than the ST ratio by at least the threshold amount, or the ST ratio is greater than the LT ratio by at least the threshold amount. More formally, the absolute values of the difference at a point in time "t" as noted above may be expressed as:

$$\text{Diff}_t = |\text{LT ratio}_t - \text{ST ratio}_t| \quad \text{EQUATION 7}$$

where

LT ratio$_t$ is the LT ratio at time "t";

ST ratio$_t$ is the LT ratio at time "t";

| . . . | denotes the absolute value of the difference expression between the pair of lines (e.g., ||); and Diff$_t$ denotes the resulting absolute value of the difference at time "t".

The specified threshold that the Diff$_t$ exceeds in an embodiment in accordance with techniques herein may be generally any suitable threshold value. For example, in one embodiment, the threshold value used at a point in time may 50% of the LT ratio at the point in time. If Diff$_t$ exceeds the threshold, processing may further be performed to determine a resulting state denoting a desired CPU core distribution between the FE/FA and BE/DA tasks based on the ST ratio.

Figure 5:
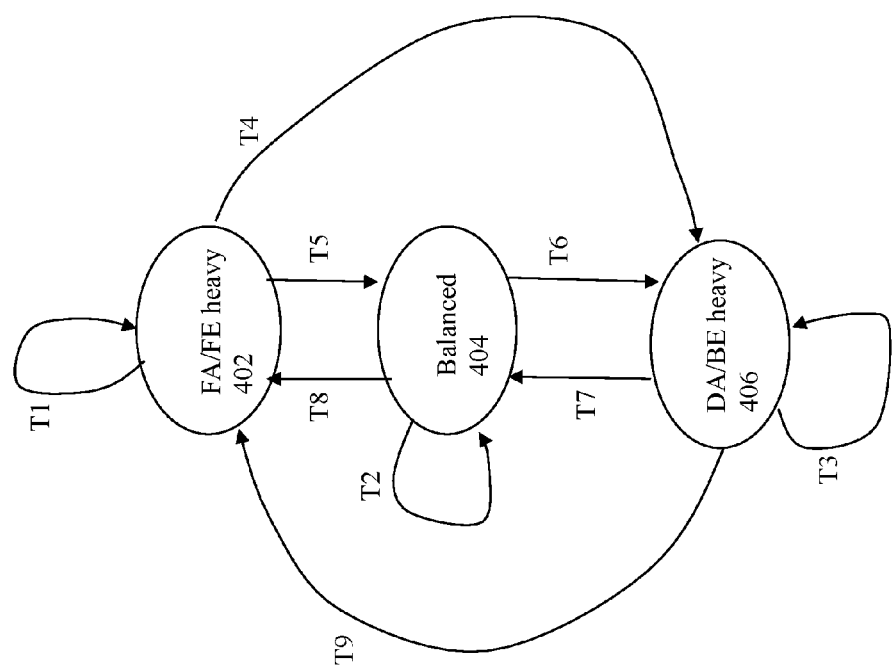
FIG. 5 is an example of workload states in an embodiment in accordance with techniques herein.

Referring to FIG. 5, shown is an example illustrating different states and associated transitions therebetween that may be used in an embodiment in accordance with techniques herein. Each of 402, 404 and 406 denote different I/O workload states indicating different configurations of CPU core distributions between the DAs/BE tasks and FAs/FE tasks.

Element 402 may denote an FA or FE heavy workload state denoting an FA or FE heavy configuration where it is desirous to have relatively more CPU cores allocated for performing FA/FE tasks in comparison to the number of CPU cores allocated for performing DA/BE tasks. For example, when in state and configuration 402, there may be a first number of CPU cores allocated for performing FA or FE tasks and a second number of CPU cores allocated for performing DA or BE tasks where the first number is larger than the second number. It should be noted that a FE heavy workload of state 402 may indicate that a workload of the FE exceeds the workload of the BE by some specified threshold or amount.

Element 404 may a balanced state denoting a balanced configuration where it is desirous to have the same number of CPU cores allocated to performing FA/FE tasks and performing DA/BE tasks. Thus, state 404 may denote a configuration where there are an equal number of CPU cores allocated to performing FA/FE tasks and performing DA/BE tasks. It should be noted that a balanced workload of state 402 may indicate that a workload of the FE is approximately the same as the workload of the BE, within some specified threshold or amount.

Element 406 may denote a DA or BE heavy workload state denoting a DA or BE heavy configuration where it is desirous to have relatively more CPU cores allocated for performing DA/BE tasks in comparison to the number of CPU cores allocated for performing FA/FE tasks. For example, when in state and configuration 406, there may be a first number of CPU cores allocated for performing FA or FE tasks and a second number of CPU cores allocated for performing DA or BE tasks where the second number is larger than the first number. It should be noted that a BE heavy workload of state 406 may indicate that a workload of the BE exceeds the workload of the FE by some specified threshold or amount.

At any point in time, the system may be in a current state denoted by one of 402, 404 and 406 indicating a current partitioning or distribution of CPU cores corresponding to the current state. For a first point in time, the system may be in a current state and have an associated CPU core distribution (where a number of the CPU cores are allocated to perform FE processing tasks and a number of the CPU cores are allocated to perform BE processing task) and a resulting state or target for the first point in time may be determined based on the ST ratio at the first point in time. The resulting state or target state may denote a target configuration with a target distribution of the CPU cores between the FE and BE processing tasks. The system may then transition from the current state to the target or resulting state (and the target configuration) where such transitions are denoted by transition arrows T1-T9 in FIG. 5.

In one embodiment, the target or resulting state may be the FA/FE heavy state 402 if the ST ratio at the first point in time is greater than a first threshold Thresh1. The target or resulting state may be the DA/BE heavy state 406 if the ST ratio at the first point in time is less than a second threshold Thresh2, wherein Thresh2<Thresh1. The target or resulting state may be the balanced state 404 if the ST ratio falls within the inclusive range of values from lower bound Thresh2 to upper bound Thresh1 (e.g., Thresh2≤ST ratio≤Thresh1). In one embodiment, Thresh2 may be 0.75 and Thresh1 may be 1.50. However, more generally, any suitable values may be selected for Thresh1 and Thresh2 for use in an embodiment in accordance with techniques herein.

The example 400 illustrates the following transitions:

T1 where the current state and the target or resulting state are both FA/FE heavy 402.

T2 where the current state and the target or resulting state are both balanced 404.

T3 where the current state and the target or resulting state are both DA/BE heavy 402.

T4 where the current state is FA/FE heavy 402 which transitions to the target or resulting state DA/BE heavy 406.

T5 where the current state is FA/FE heavy 402 which transitions to the target or resulting state of balanced 404.

T6 where the current state is balanced 404 which transitions to the target or resulting state DA/BE heavy 406.

T7 where the current state is DA/BE heavy 406 which transitions to the target or resulting state of balanced 404.

T8 where the current state is balanced which transitions to the target or resulting state FA/FE heavy 402.

T9 where the current state is DA/BE heavy 406 which transitions to the target or resulting state FA/FE heavy 402.

It should be noted that if any of transitions T1-T3 are performed, then there are no adjustments made to the current allocation or distribution of CPU cores between the FA/FE tasks and the DA/BE tasks (e.g. both current and target or resulting states are the same). In one embodiment in accordance with techniques herein, for any of the remaining transition T4-T9, desired repartitioning of the CPU cores may be performed to achieve the target or resulting state using software.

It should be noted that in configurations having different processor partitionings associated with the states of FIG. 5, a set of processors may be generally partitioned into 3 groups such as described elsewhere herein. In at least one embodiment, the number of processors in the data services or middleware group may remain the same in each of the states of FIG. 5 where a transition between different states may result in adjustments to the number of processors allocated to performing DA/BE I/O processing tasks and also the number of processors allocated to performing FA/FE I/O processing tasks. In such an embodiment, increasing the number of processors by "N" (N being an integer greater than 1) in one of the latter 2 groups may result in decreasing the number of processors by "N" in the other of the latter 2 groups (e.g., transition from state 404 to 402 may result in increasing by 1 the number of processors performing FA/FE I/O processing tasks and decreasing by 1 the number of processors performing DA/BE I/O processing tasks).

Figure 6:
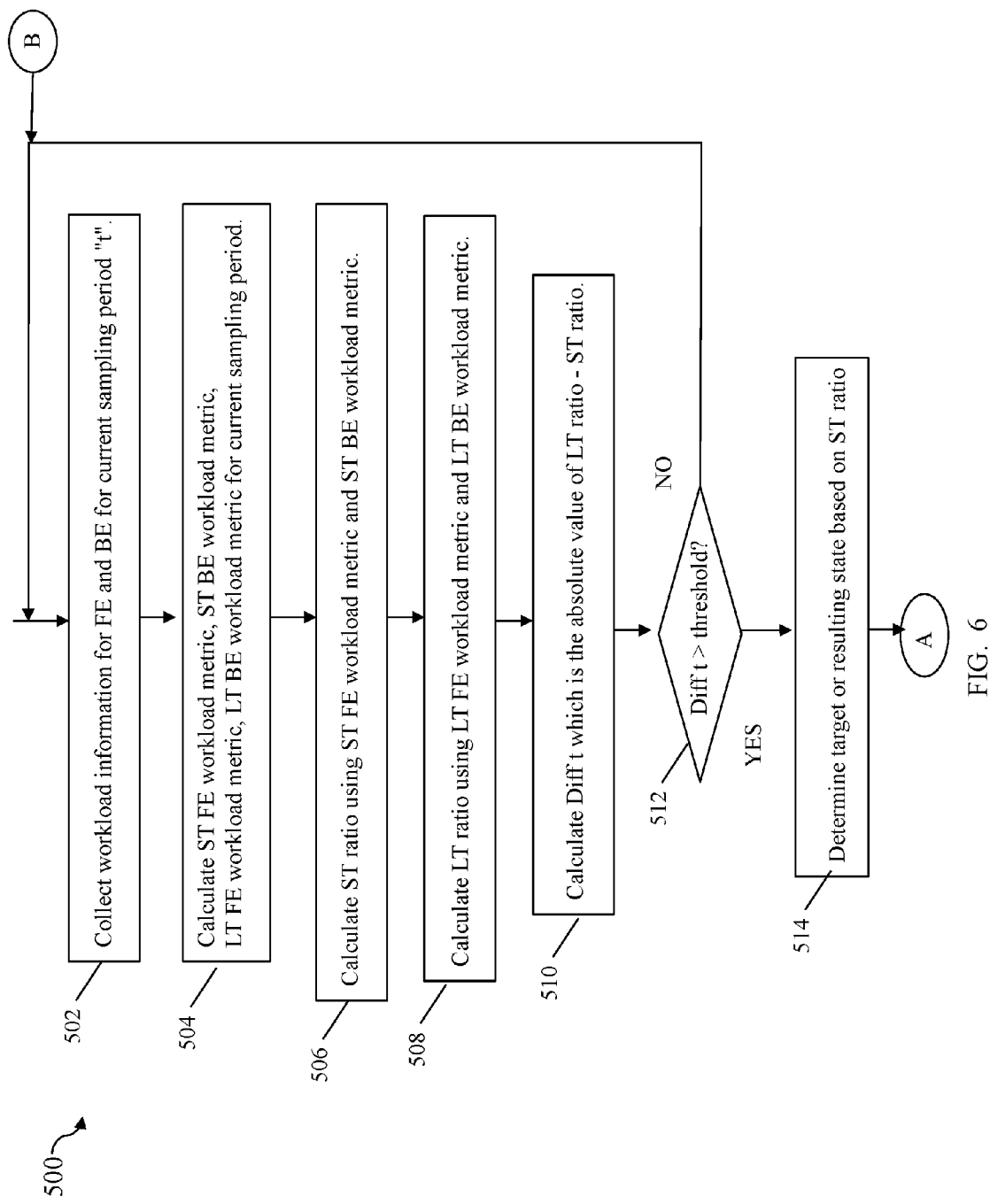
FIGS. 6 and 7 are flowcharts of processing steps that may be performed in an embodiment in accordance with techniques herein.
Figure 7:
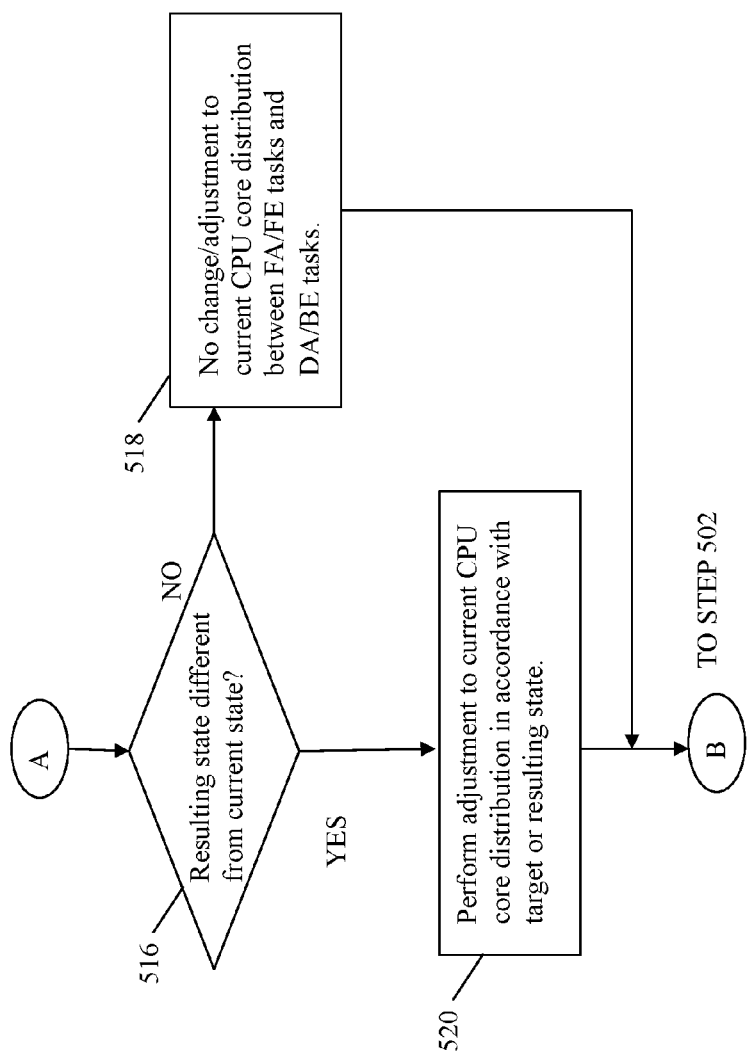

Referring to FIGS. 6 and 7, shown is a flowchart of processing steps that may be performed in an embodiment in accordance with techniques herein. The flowchart 500 summarizes processing described above.

In step 502, workload information is collected for the FE (e.g. workload for processors performing FE/FA I/O processing tasks) and BE (e.g. workload for processors performing BE/DA I/O processing tasks) for the current sampling period at time "t". At step 504, the following metrics may be calculated: ST FE workload metric (EQUATION 1), ST BE workload metric (EQUATION 2), LT FE workload metric (EQUATION 3) and LT BE workload metric (EQUATION 4). At step 506, the ST ratio may be calculated using the ST FE workload metric and ST BE workload metric (EQUATION 5). At step 508, the LT ratio may be calculated using the LT FE workload metric and LT BE workload metric (EQUATION 6). At step 510, $\text{Diff}_t$, denoting the absolute value of the different between the LT ratio and the ST ratio for the current sampling period at time "t", may be calculated (EQUATION 7). At step 512, a determination is made as to whether $\text{Diff}_t$ exceeds a defined threshold. If step 512 evaluates to no, control proceeds to step 502. If step 512 evaluates to yes, control proceeds to step 514 to determine the target or resulting I/O workload state based on the ST ratio for the current sample period at time "t". Examples of states and associated CPU core partitioning are described elsewhere herein such as in connection with FIG. 5. At step 516, a determination is made as to whether the target or resulting I/O workload state is different than the current I/O workload state. If step 516 evaluates to no whereby the current I/O workload state and the target or resulting I/O workload state are the same, control proceeds to step 518 where no change or adjustment is made to the current CPU core distribution as between the FA/FE tasks and the DA/BE tasks. From step 518 control proceeds to step 502 to await the next sampling period. If step 516 evaluates to yes control proceeds to step 520 where an adjustment is made to the current CPU core distribution between the FA/FE tasks and the DA/BE tasks in accordance with the resulting I/O workload state. From step 520, control proceeds to step 502 to await the next sampling period.

Figure 8:
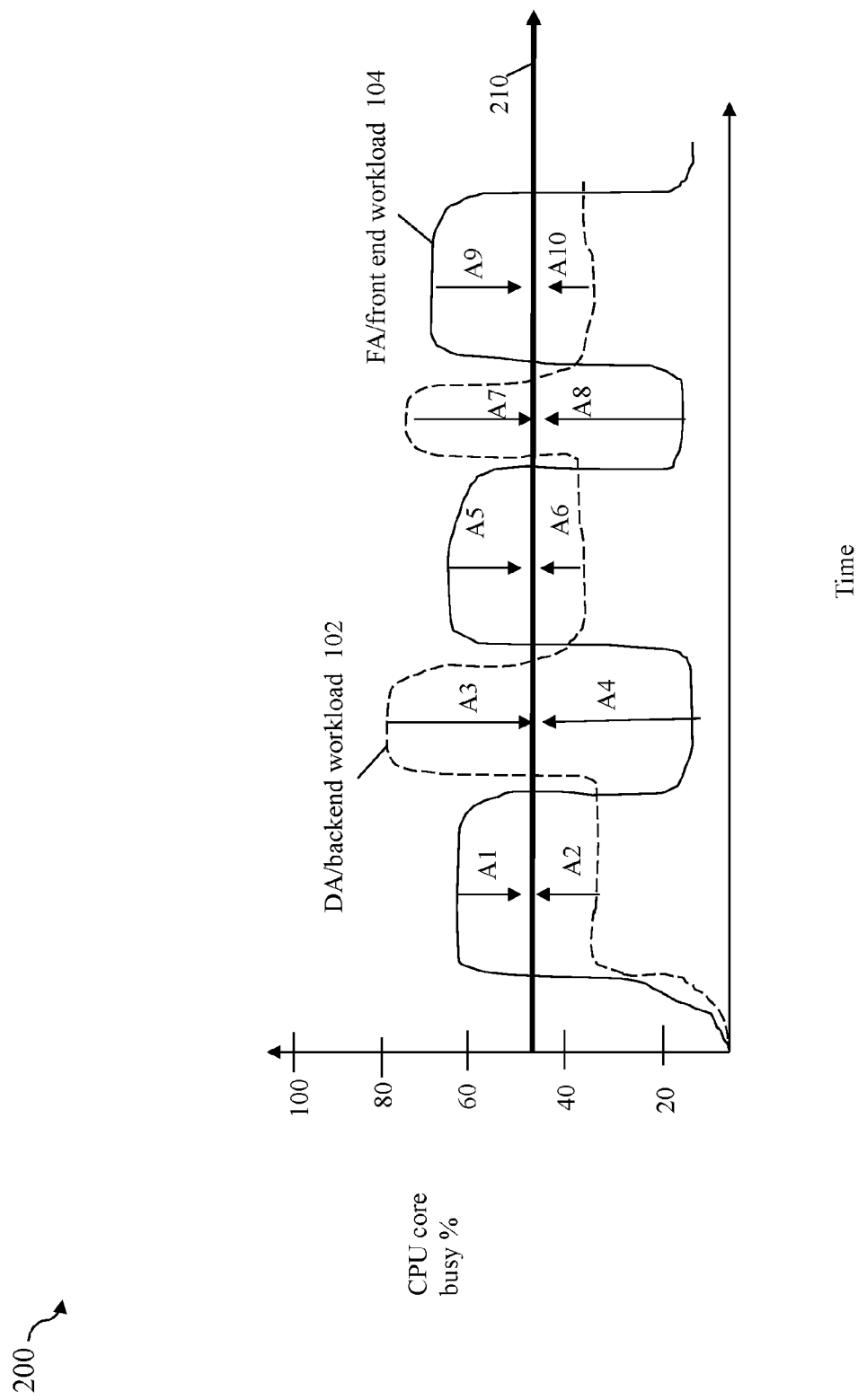

FIG. 8 is an example illustrating an effect or net result on CPU core or processor utilization in an embodiment using techniques herein. The example 200 includes curves 102 DA/backend workload and 104 FE/front end workload of FIG. 3 with additional annotations illustrating a net result of techniques herein where such techniques result in the CPU core busy percentage at various point in time toward goal line 210. In other words, techniques herein result in a more even distribution of workload across all CPU cores by dynamically adjusting the distribution of CPU cores for FA and DA usage responsive to changes in workloads, an overall workload trend based on short term and long term moving averages of the workloads, and short term workload. In particular, the example 200 illustrates a goal of keeping the average CPU % utilization under 50% overall by redistributing CPU cores between the front end/FA and back end/DA tasks. Arrows A1, A5 and A9 illustrate a movement resulting from use of techniques herein in reducing the CPU % at various points in time by increasing the allocation of CPU cores performing DA or backend tasks (e.g., CPU cores may be donated from those performing FA or front end tasks). Arrows A3 and A7 illustrate a movement resulting from use of techniques herein in reducing the CPU % at various points in time by increasing the allocation of CPU cores performing FA or front end tasks (e.g., CPU cores may be donated from those performing DA or back end tasks).

Arrows A2, A6 and A10 illustrate a movement resulting from use of techniques herein in increasing the CPU % at various points in time by decreasing the allocation of CPU cores performing DA or backend tasks (e.g., such CPU cores from DA or back end task usage during time periods A2, A6 and A10 may be reallocated for use as FAs or performing front end tasks, respectively, during time periods associated with A1, A5 and A9).

Arrows A4 and A8 illustrate a movement resulting from use of techniques herein in increasing the CPU % at various points in time by decreasing the allocation of CPU cores performing FA or front end tasks (e.g., such CPU cores from FA or front end task usage during time periods A4, and A8 may be reallocated for use as DAs or performing back end tasks, respectively, during time periods associated with A3 and A7).

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of partitioning processors in a system comprising:
    determining, using a processor at a first point in time, a short term workload ratio and a long term workload ratio, wherein, at the first point in time, the system is in a first workload state having a first configuration including a first portion of the processors performing front end processing tasks and a second portion of the processors performing back end processing tasks;
    determining, using a processor, a first value that is an absolute value of a difference between the short term workload ratio and the long term workload ratio; and
    performing first processing using a processor to determine, in accordance with the first value and the short term workload ratio, whether to make an adjustment to any of: a first number of the processors that are currently in the first portion and that currently perform front end processing tasks, and a second number of the processors that are currently in the second portion and that currently perform back end processing tasks.

2. The method of claim 1, wherein the first processing further comprises:
    determining whether the first value exceeds a threshold; and
    if the first value does not exceed the threshold, determining not to make an adjustment any of the first number of the processors of the first portion and the second number of processors of the second portion of the first configuration.

3. The method of claim 2, wherein the first processing further comprises:
    if the first value exceeds the threshold, performing second processing using a processor, the second processing comprising:
        determining a target workload state in accordance with the short term workload ratio, said target workload state indicating a target configuration with a target partitioning of the processors between performing front end processing tasks and back end processing tasks.

4. The method of claim 3, wherein the second processing includes:
    determining whether the current workload state and the target workload state are different; and
    if it is determined that the current workload state and the target workload state are different, performing an adjustment to the first configuration to repartition, in accordance with the target configuration, the processors between performing front end processing tasks and back end processing tasks.

5. The method of claim 4, wherein each of the current workload state and the target workload state denote any of a balanced state, a front end heavy state, and a back end heavy state.

6. The method of claim 5, wherein the current workload state is any of the balanced state and the front end heavy state and the target workload state is the back end heavy state, and processing is performed to increase a number of the processors in the second portion and decrease a number of the processors in the first portion.

7. The method of claim 5, wherein the current workload state is any of the balanced state and the back end heavy state and the target workload state is the front end heavy state, and the method includes performing processing to increase a number of the processors in the first portion and decrease a number of the processors in the second portion.

8. The method of claim 5, wherein the target workload state is the balanced state and the current workload state is any of the back end heavy state and the front end heavy workload, and the method includes performing processing to partition a same number of the processors in both the first portion and the second portion.

9. The method of claim 1, wherein the short term workload ratio is a ratio of a short term front end workload metric with respect to a short term back end workload metric.

10. The method of claim 1, wherein the long term workload ratio is a ratio of a long term front end workload metric with respect to a long term back end workload metric.

11. The method of claim 1, wherein the short term workload ratio and the long term workload ratio denote an overall workload trend.

12. The method of claim 1, wherein the system is a data storage system.

13. The method of claim 12, wherein the front end processing tasks include tasks performed for processing received I/O operations at the data storage system.

14. The method of claim 13, wherein the back end processing tasks include tasks performed for back end I/O operations of the data storage system and include accessing physical storage devices of the data storage system.

15. A system comprising:
a plurality of processors; and
a memory comprising code stored therein that, when executed, performs a method of partitioning the processors comprising:
determining, at a first point in time and using at least one of the plurality of processors, a short term workload ratio and a long term workload ratio, wherein, at the first point in time, the system is in a first workload state having a first configuration including a first portion of the processors performing front end processing tasks and a second portion of the processors performing back end processing tasks;
determining, using at least one of the plurality of processors, a first value that is an absolute value of a difference between the short term workload ratio and the long term workload ratio; and
performing first processing using at least one of the plurality of processors to determine, in accordance with the first value and the short term workload ratio, whether to make an adjustment to any of: a first number of the processors that are currently in the first portion and that currently perform front end processing tasks, and a second number of the processors that are currently in the second portion and that currently perform back end processing tasks.

16. A non-transitory computer readable medium comprising code stored thereon that, when executed, performs a method of partitioning processors in a system comprising:
determining, at a first point in time, a short term workload ratio and a long term workload ratio, wherein, at the first point in time, the system is in a first workload state having a first configuration including a first portion of the processors performing front end processing tasks and a second portion of the processors performing back end processing tasks;
determining a first value that is an absolute value of a difference between the short term workload ratio and the long term workload ratio; and
performing first processing to determine, in accordance with the first value and the short term workload ratio, whether to make an adjustment to any of: a first number of the processors that are currently in the first portion and that currently perform front end processing tasks, and a second number of the processors that are currently in the second portion and that currently perform back end processing tasks.

17. The non-transitory computer readable medium of claim 16, wherein the first processing further comprises:
determining whether the first value exceeds a threshold; and
if the first value does not exceed the threshold, determining not to make an adjustment any of the first number of the processors of the first portion and the second number of processors of the second portion of the first configuration.

18. The non-transitory computer readable medium of claim 17, wherein the first processing further comprises:
if the first value exceeds the threshold, performing second processing comprising:
determining a target workload state in accordance with the short term workload ratio, said target workload state indicating a target configuration with a target partitioning of the processors between performing front end processing tasks and back end processing tasks.

19. The non-transitory computer readable medium of claim 18, wherein the second processing includes:
determining whether the current workload state and the target workload state are different; and
if it is determined that the current workload state and the target workload state are different, performing an adjustment to the first configuration to repartition, in accordance with the target configuration, the processors between performing front end processing tasks and back end processing tasks.

20. The non-transitory computer readable medium of claim 19, wherein each of the current workload state and the target workload state denote any of a balanced state, a front end heavy state, and a back end heavy state.

* * * * *